US012234963B2

(12) United States Patent
Jun

(10) Patent No.: US 12,234,963 B2
(45) Date of Patent: Feb. 25, 2025

(54) LAMP FOR VEHICLE

(71) Applicant: HYUNDAI MOBIS CO., LTD., Seoul (KR)

(72) Inventor: Young Geun Jun, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/448,867

(22) Filed: Aug. 11, 2023

(65) Prior Publication Data

US 2024/0218995 A1 Jul. 4, 2024

(30) Foreign Application Priority Data

Dec. 28, 2022 (KR) ........................ 10-2022-0187681

(51) Int. Cl.

*F21S 41/63* (2018.01)
*F21S 41/143* (2018.01)
*F21S 41/20* (2018.01)
*F21S 41/25* (2018.01)

(52) U.S. Cl.

CPC ........... *F21S 41/635* (2018.01); *F21S 41/143* (2018.01); *F21S 41/25* (2018.01); *F21S 41/285* (2018.01)

(58) Field of Classification Search

CPC ........ F21S 41/635; F21S 41/143; F21S 41/25; F21S 41/285; F21S 41/675; F21V 14/04; F21V 14/06; F21V 17/002

See application file for complete search history.

(56) References Cited

U.S. PATENT DOCUMENTS

| | | | | |
|---|---|---|---|---|
| 6,910,790 B2 * | 6/2005 | De Lamberterie ... | F21S 41/275 | 362/523 |
| 8,801,242 B2 * | 8/2014 | Hamm .................. | F21S 41/151 | 362/487 |
| 2002/0085387 A1 * | 7/2002 | Taniuchi ............... | F21S 41/321 | 362/524 |
| 2003/0090906 A1 * | 5/2003 | Hayakawa ............ | F21S 41/675 | 362/346 |
| 2014/0016343 A1 * | 1/2014 | Brendle ................ | F21S 41/255 | 362/516 |
| 2014/0092618 A1 * | 4/2014 | Yagi ...................... | F21S 41/663 | 362/512 |
| 2014/0198513 A1 * | 7/2014 | Stefanov ............... | F21S 41/663 | 362/511 |
| 2016/0102831 A1 * | 4/2016 | Okubo .................. | F21S 41/635 | 362/512 |

FOREIGN PATENT DOCUMENTS

| | | |
|---|---|---|
| KR | 20210124788 A | * 10/2021 |
| KR | 20210125760 A | * 10/2021 |

* cited by examiner

*Primary Examiner* — Tsion Tumebo
(74) *Attorney, Agent, or Firm* — DLA Piper LLP US

(57) ABSTRACT

A lamp for a vehicle including a light source part including a board, and a plurality of light sources installed on the board, alight concentrating lens part that concentrates light irradiated from the light source part, including a first optic, and a second optic connected to the first optic, and that is rotatable, an output lens part, to which light concentrated by the first optic or the second optic is input and from which the light is output to an outside, and a switching driving part that provides driving force that rotates the light concentrating lens part.

12 Claims, 12 Drawing Sheets

LAMP FOR VEHICLE

CROSS-REFERENCE TO RELATED APPLICATION

This application claims the benefit of priority to Korean Patent Application No. 10-2022-0187681, filed in the Korean Intellectual Property Office on Dec. 28, 2022, the entire contents of which are incorporated herein by reference.

TECHNICAL FIELD

The present disclosure relates to a lamp for a vehicle.

BACKGROUND

Among lamps for a vehicle, a headlamp that forms a low beam pattern or a high beam pattern such that a front field of view of a driver is secured during nighttime driving takes a very important role in safe driving.

Furthermore, in recent years, headlamps (for example, bi-function headlamps), in which functions of a low beam pattern and a high beam pattern are integrated into one, have been used.

A matrix headlamp technology is a technology of increasing a visibility by partially turning on a high beam in conjunction with a camera sensor even when a facing vehicle or a preceding vehicle is present on a front side r. A plurality of LEDs may be applied by using the matrix headlamp technology, and one or more dark parts may be formed by turning on or off the LEDs individually whereby a high beam may be always implemented. In recent years, the matrix includes two or more rows of multi-row beam patterns, and among them, one row of matrix beam is configured to implement an electronic dynamic bending light (E-DBL) function of the low beam whereby a product having an enhanced product value may be released.

However, when two rows of matrices are formed, many light sources (for example, LEDs) are required whereby the price thereof increases. In particular, in the case of the E-DBL, a lighting ratio is low as compared with the required light sources whereby efficiency deteriorates. Accordingly, it is necessary to improve a technology of reducing costs by applying an efficient number of light sources while coping with a trend of preferring the E-DBL.

SUMMARY

The present disclosure has been made to solve the above-mentioned problems occurring in the prior art while advantages achieved by the prior art are maintained intact.

An aspect of the present disclosure provides a lamp for a vehicle that may simultaneously implement a DBL function of a low beam and an ADB function of a high beam by applying an efficient number of light sources.

Another aspect of the present disclosure provides a lamp for a vehicle that may employ an inexpensive actuator that is driven with a low torque as a driving source.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle, includes a light source part including a board, and a plurality of light sources installed on the board, a light concentrating lens part that concentrates light irradiated from the light source part, including a first optic, and a second optic connected to the first optic, and that is rotatable, an output lens part, to which the light concentrated by the first optic or the second optic is input and from which the light is output to an outside, and a switching driving part that provides driving force that rotates the light concentrating lens part, and the light concentrating lens part may be selectively located at any one of a first location, at which the light generated by the light source part is input to the first optic, and a second location, at which the light generated by the light source part is input to the second optic, through rotation thereof.

When an area including a center of the board in a leftward/rightward direction is defined as a central area, and an area of the board, except for the central area, is defined as an outskirt area, the number of the light sources disposed in the central area may be larger than the number of the light sources disposed in the outskirt area.

The light concentrating lens part may further include a lens body integrally connecting the first optic and the second optic and that transmits the light.

The light concentrating lens part may further include a switching optic provided between the first optic and the second optic and that irradiates the light input from the light source part to a front side when the light concentrating lens part is rotated, a first reflective layer formed on a surface of the first optic, which faces the switching optic, and including a material that reflects the light, and a second reflective layer formed on a surface of the second optic, which faces the switching optic, and including a material that reflects the light.

The switching driving part may include a housing, a driving source mounted on the housing, a shaft member mounted on the housing, that is rotated by the driving source, and to which the light concentrating lens part is coupled, and a gear unit connected to the driving source and the shaft member, and that transmits driving power generated by the driving source to the shaft member.

The switching driving part may further include a connection block fixed to the shaft member to be rotated together therewith, and connected to the gear unit to be rotatable, the connection block may be rotated about a central axis of the shaft member through transmission of the driving power to the gear unit, and the light concentrating lens part may be rotated to interlock with the connection block when the connection block is rotated.

The connection block may include a block body, through which the shaft member passes, and a block boss protruding from the block body, and having a pin hole, through which a connection pin provided in the gear unit passes.

The gear unit may include a first gear coupled to a driving shaft of the driving source, and a second gear enmeshed with the first gear and from which the connection pin protrudes.

A rotation axis of the second gear and a central axis of the connection pin may be formed at different locations.

The switching driving part may further include a fixing spring provided on an outer surface of the shaft member, and that provides an elastic restoring force for restoring the light concentrating lens part to the first location when the driving source is not driven.

The housing may include a stopper boss protruding at a location, at which the connection block is stopped, such that rotation of the light concentrating lens part by the fixing spring is restricted.

A first light distribution pattern formed by the light that passes the first optic may be a low beam pattern, and a second light distribution pattern formed by the light that passes through the second optic may be a high beam pattern.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described below with reference to the accompanying drawings.

First, the embodiments that will be described below are embodiments that are suitable for helping understand technical features of a lamp for a vehicle according to the present disclosure. However, neither the present disclosure is limited to the embodiments that will be described below to be applied nor the technical features of the present disclosure are limited by the embodiments, and the present disclosure may be variously modified while departing from the technical range of the present disclosure.

Figure 1:
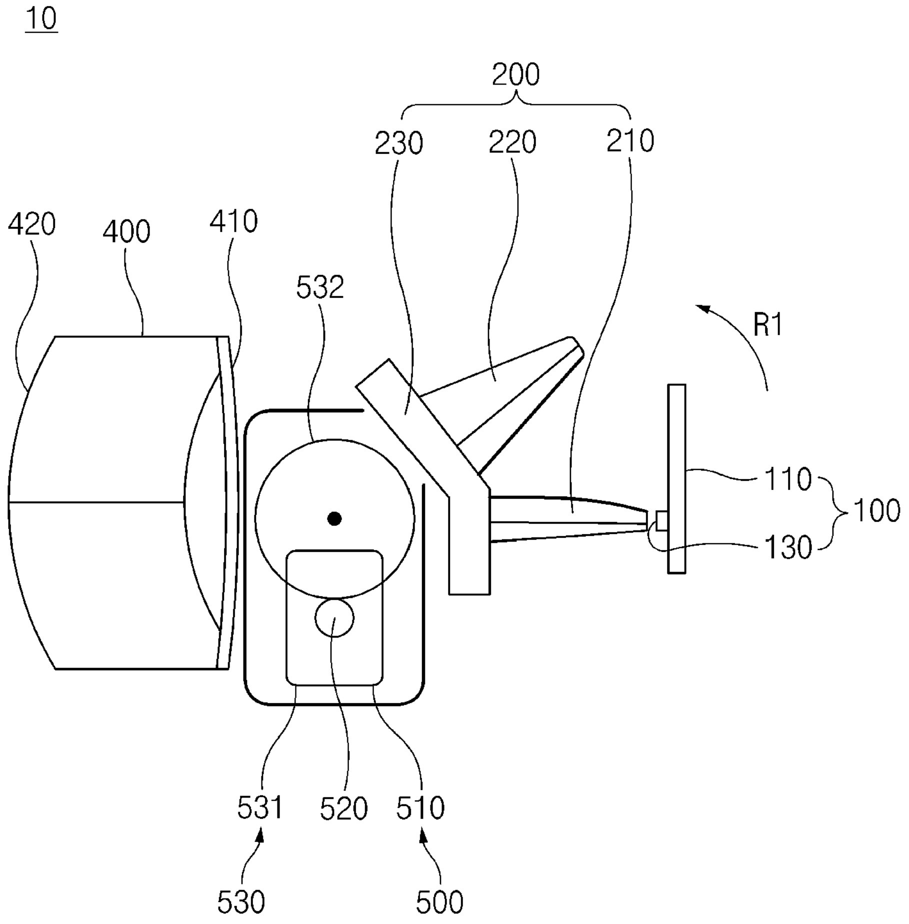
FIG. 1 illustrates a lamp for a vehicle according to a first embodiment of the present disclosure, and illustrates that a light concentrating lens part is located at a first location.
Figure 2:
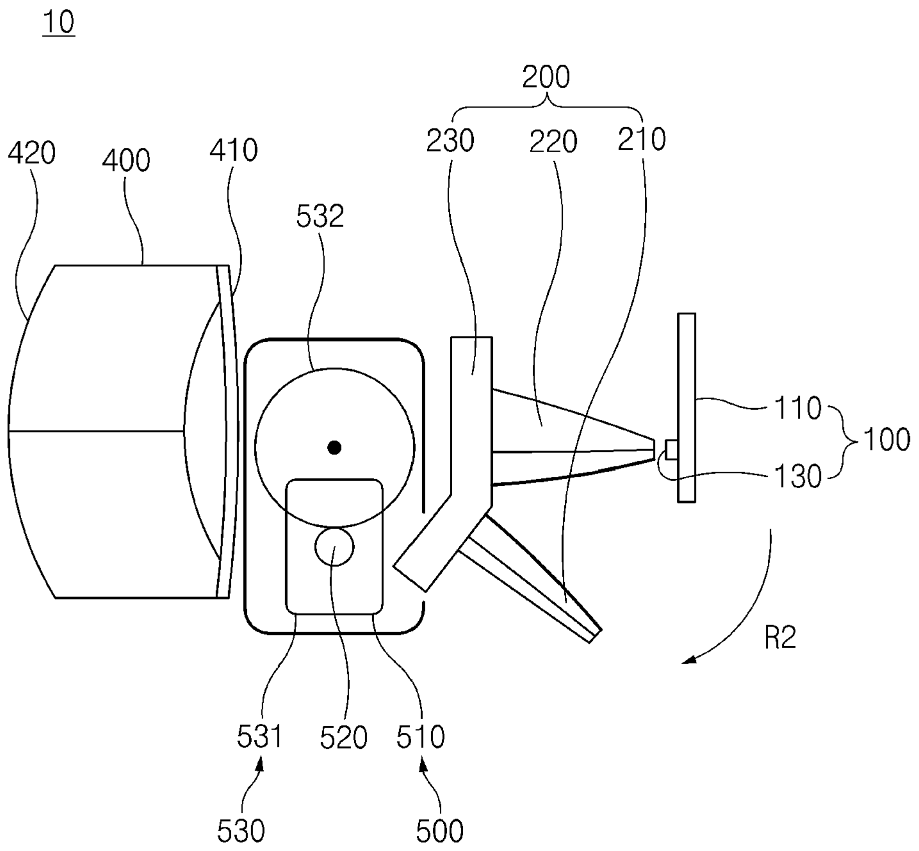
FIG. 2 illustrates a lamp for a vehicle according to a first embodiment of the present disclosure, and illustrates that a light concentrating lens part is located at a second location.
Figure 3:
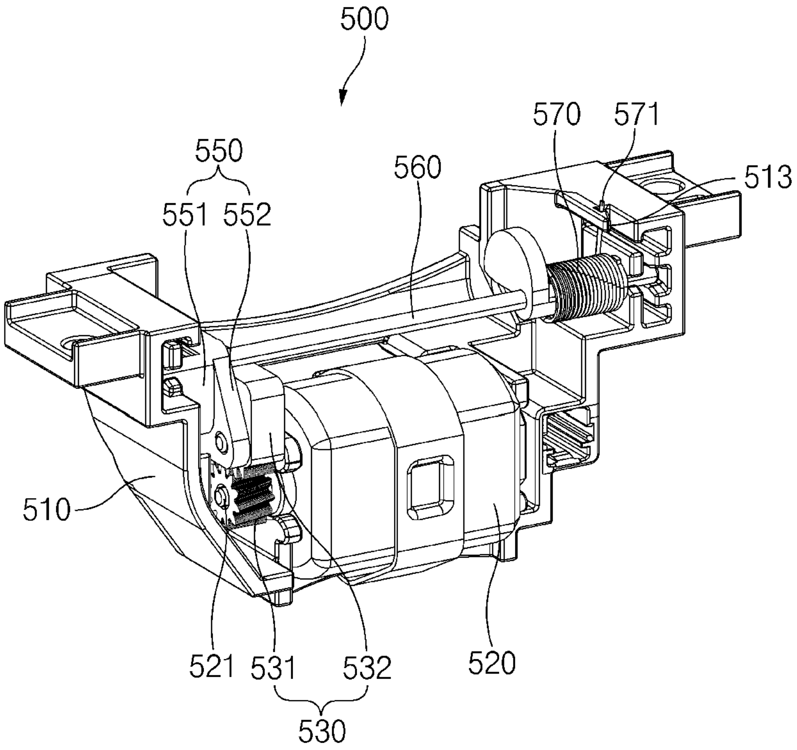
FIG. 3 is a perspective view of a switching driving part according to a first embodiment of the present disclosure, when viewed from one side in a leftward/rightward direction.
Figure 4:
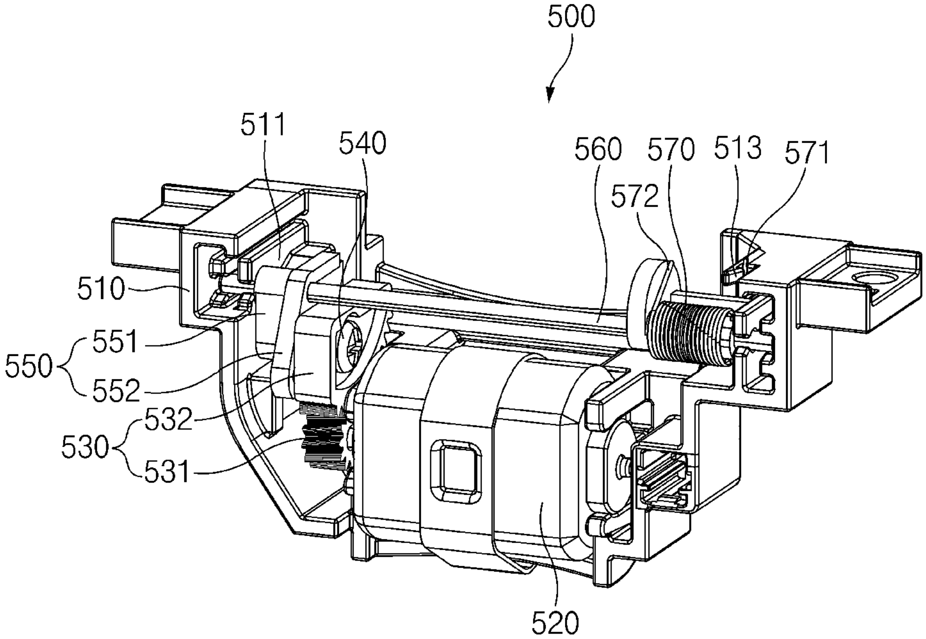
FIG. 4 is a perspective view of a switching driving part according to a first embodiment of the present disclosure, when viewed from an opposite side in a leftward/rightward direction.
Figure 5:
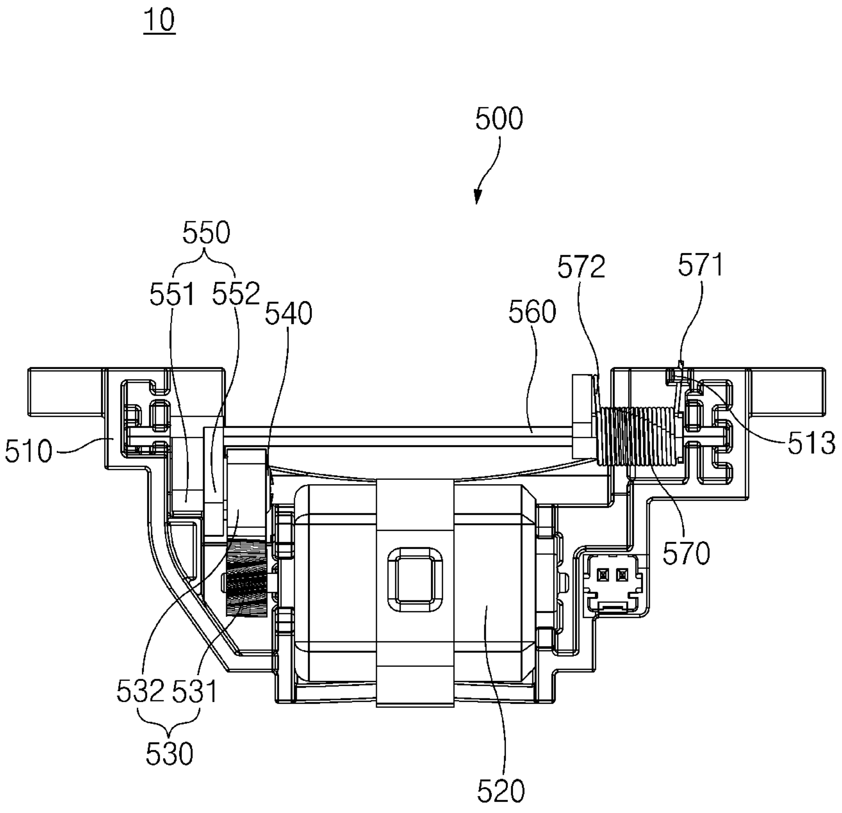
FIG. 5 is a front view illustrating a switching driving part according to a first embodiment of the present disclosure.
Figure 6:
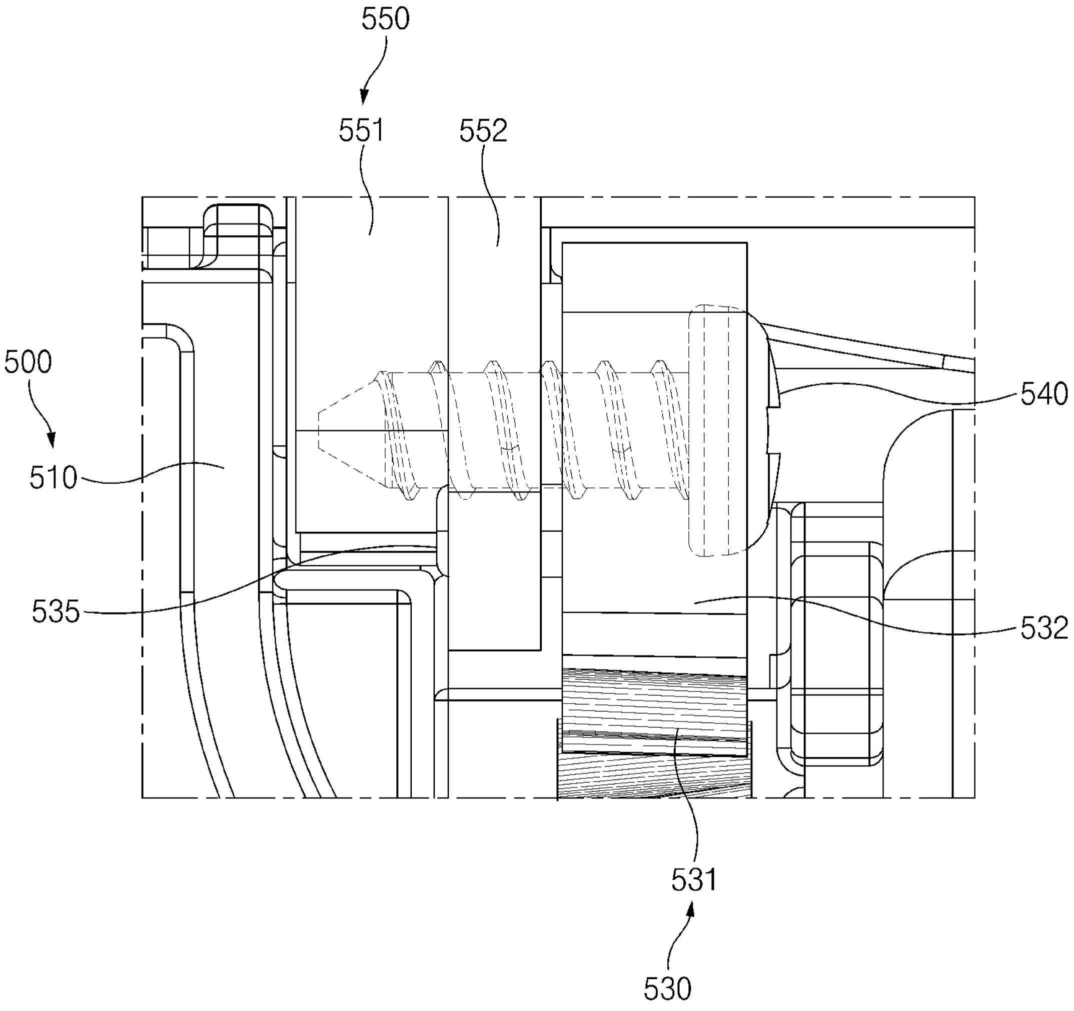
FIG. 6 is an enlarged view of a portion of FIG. 5, and is a view illustrating connection of a connection block and a gear unit.
Figure 7:
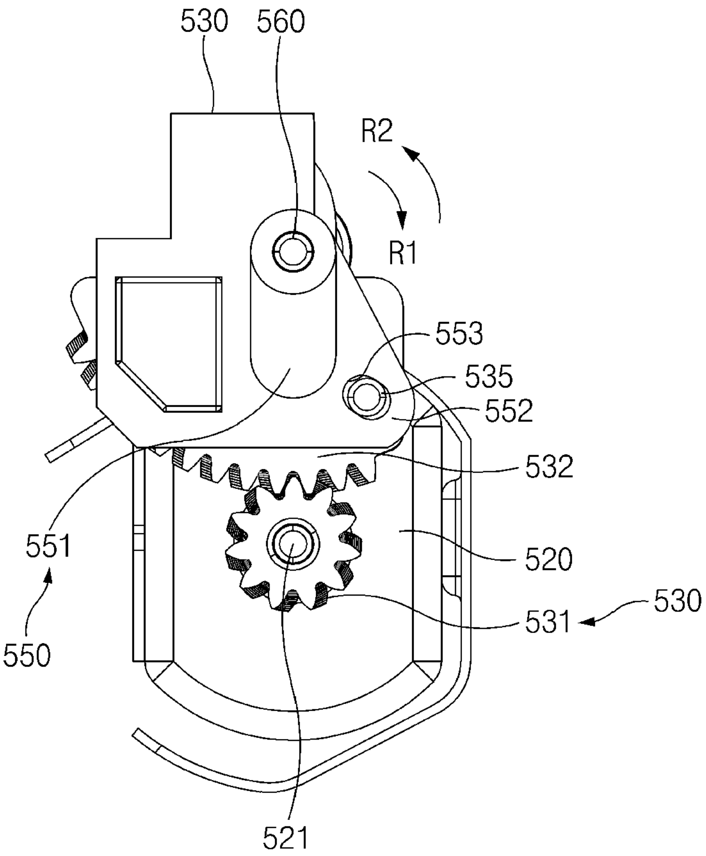
FIG. 7 is a side view of a switching driving part according to a first embodiment of the present disclosure, which is viewed from one side in a leftward/rightward direction, and illustrate a state, in which a housing is removed.
Figure 8:
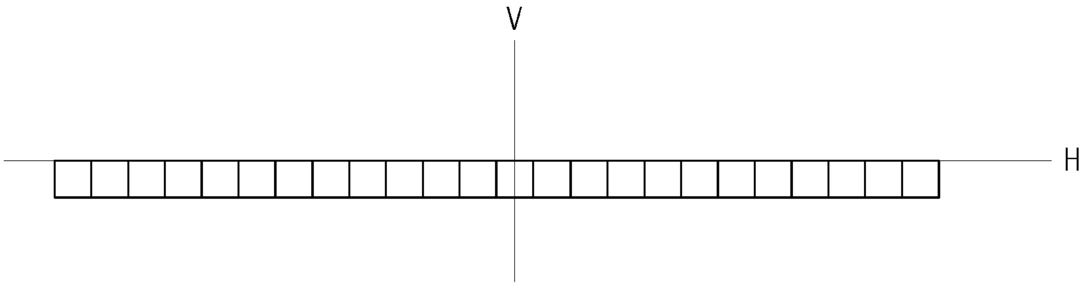
FIG. 8 is a view illustrating a first light distribution pattern formed by a lamp for a vehicle according to a first embodiment of the present disclosure.
Figure 9:
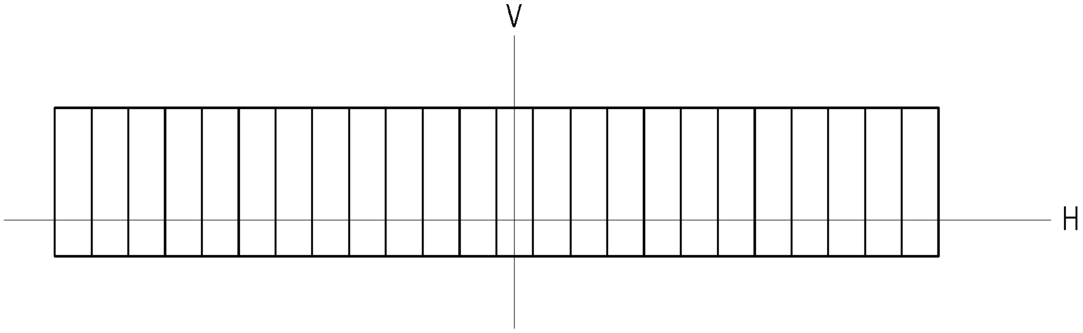
FIG. 9 is a view illustrating a second light distribution pattern formed by a lamp for a vehicle according to a second embodiment of the present disclosure.
Figure 10:
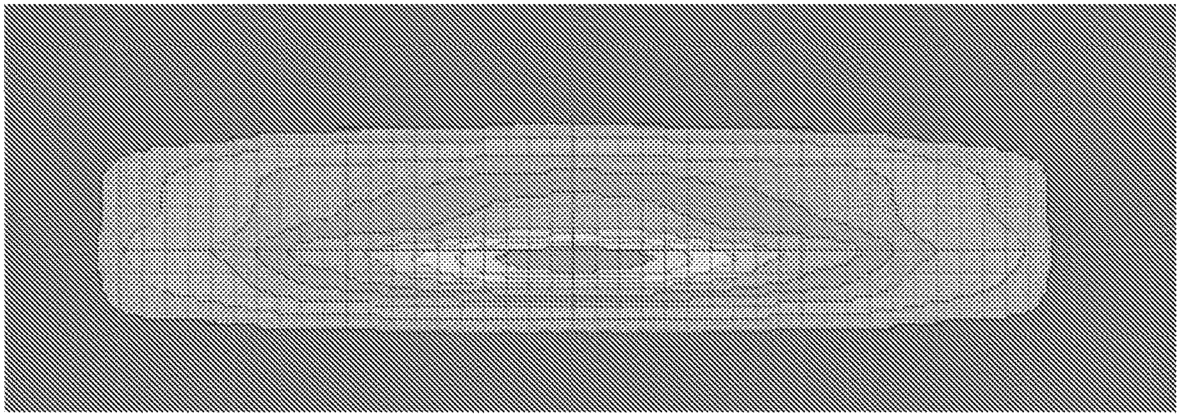
FIG. 10 is a view illustrating an example of alight distribution pattern formed by a lamp for a vehicle according to a first embodiment of the present disclosure.

FIG. 1 illustrates a lamp for a vehicle according to a first embodiment of the present disclosure, and illustrates that a light concentrating lens part is located at a first location, FIG. 2 illustrates the lamp for a vehicle according to the first embodiment of the present disclosure, and illustrates that alight concentrating lens part is located at a second location, FIG. 3 is a perspective view of a switching driving part according to the first embodiment of the present disclosure, when viewed from one side in a leftward/rightward direction, FIG. 4 is a perspective view of the switching driving part according to the first embodiment of the present disclosure, when viewed from an opposite side in a leftward/rightward direction, FIG. 5 is a front view illustrating the switching driving part according to the first embodiment of the present disclosure, FIG. 6 is an enlarged view of a portion of FIG. 5, and is a view illustrating connection of a connection block and a gear unit, FIG. 7 is a side view of the switching driving part according to a first embodiment of the present disclosure, which is viewed from one side in a leftward/rightward direction, and illustrate a state, in which a housing is removed, FIG. 8 is a view illustrating a first light distribution pattern formed by the lamp for a vehicle according to the first embodiment of the present disclosure, FIG. 9 is a view illustrating a second light distribution pattern formed by a lamp for a vehicle according to a second embodiment of the present disclosure, FIG. 10 is a view illustrating an example of alight distribution pattern formed by the lamp for a vehicle according to the first embodiment of the present disclosure.

A lamp 10 for a vehicle according to an embodiment of the present disclosure may be mainly used for a lighting function (for example, a headlamp or a fog lamp) or may be used for a signal function (for example, a turn signal lamp, a tail lamp, a brake lamp, or a side marker), and the present disclosure is neither limited nor restricted by the purpose of the lamp 10 for a vehicle. For example, the lamp 10 for a vehicle according to an embodiment of the present disclosure may be headlamps of a vehicle that are provided on a front left side and a front right side of the vehicle.

Hereinafter, it will be described that the embodiment of the present disclosure corresponds to a headlamp, but the kind of the lamp 10 for a vehicle according to the present disclosure is not limited thereto.

Referring to FIGS. 1 to 10, the lamp 10 for a vehicle according to an embodiment of the present disclosure includes a light source part 100, a light concentrating lens part 200, an output lens part 400, and a switching driving part 500.

The light source part 100 includes a board 110, and a plurality of light sources 130 that are installed on the board 110.

For example, the board 110 may be the printed circuit board 110, and the light sources 130 may be light emitting diodes. Lights generated by the plurality of light sources 130 may be emitted to an outside to form a plurality of beam patterns.

For example, the board 110 may have a plate shape, and some of the plurality of light sources 130 may be arranged in a transverse direction. Here, at least some of the plurality of light sources 130 may be provided to be disposed in two rows in a longitudinal direction on the board 110, but the present disclosure is not limited thereto.

The light concentrating lens part 200 is configured to concentrate the light irradiated from the light source part 100, includes a first optic 210, and a second optic 220 connected to the first optic 210, and is configured to be rotated.

Furthermore, the light concentrating lens part 200 may further include a lens body 230 that integrally connects the first optic 210 and the second optic 220 and is configured to transmit the light. The first optic 210 and the second optic 220 may be connected to each other by the lens body 230 to be integrally formed, and may be rotated together. Furthermore, sizes of the first optic 210 and the second optic 220 may be formed to become larger as they go in a direction that becomes farther from the light source part 100. An interval between the first optic 210 and the second optic 220 may become larger as it goes in a direction that faces the light source part 100.

For example, a first light distribution pattern formed by the light that passes through the first optic 210 may be a low beam pattern, and a second light distribution pattern formed by the light that passes through the second optic 220 may be a high beam pattern.

The output lens part 400 is provided such that the light concentrated by the first optic 210 or the second optic 220 is input and is output to an outside.

Here, the light concentrating lens part 200 is configured to be located at a first location, at which the light generated by the light source part 100 is input to the first optic 210, and a second location, at which the light generated by the light source part 100 is input to the second optic 220, through rotation thereof.

Furthermore, the switching driving part 500 provides driving power that rotates the light concentrating lens part 200.

In detail, the present disclosure is adapted to form the first light distribution pattern and the second light distribution pattern having different light distribution characteristics by using one light source part 100 and one output lens part 400, and is implemented through rotation of the light concentrating lens part 200. The light concentrating lens part 200 may include the first optic 210 for forming the first light distribution pattern, and the second optic 220 for forming the second light distribution pattern. Furthermore, the light concentrating lens part 200 may be rotated by the switching driving part 500, and may selectively form the first light distribution pattern and the second light distribution pattern.

In the specification, a location of the light concentrating lens part 200, at which the first optic 210 is located between the light source part 100 and the output lens part 400 to form the first light distribution pattern, will be defined as a first location. Then, the first optic 210 may form an optical path of the light irradiated from the light source part 100, and may concentrate the light and the light may be input to the output lens part 400.

In the specification, a location of the light concentrating lens part 200, at which the second optic 220 is located between the light source part 100 and the output lens part 400 to form the second light distribution pattern, will be defined as a second location. At the second location, the second optic 220 may form an optical path of the light irradiated from the light source part 100, and may concentrate the light and the light may be input to the output lens part 400. Furthermore, for convenience of description, a direction, in which the light concentrating lens part 200 is rotated to be located at the first location, will be defined as a first direction R1, and a direction, in which the light concentrating lens part 200 is rotated to be located at the second location, will be defined as a second direction R2.

In this way, in the embodiment according to the present disclosure, the light source part 100 and the output lens part 400 for forming the first light distribution pattern, and the light source part 100 and the output lens part 400 for forming the second light distribution pattern are not provided separately, but both of the first light distribution pattern and the second light distribution pattern may be implemented by one light source part 100 and the output lens part 400.

For example, when the light concentrating lens part 200 is located at the first location, the lamp 10 for a vehicle may perform a dynamic bending light (DBL) function. The DBL function means a function of moving a low beam irradiated to a front side of a vehicle along a travel direction or an inclination of a road, on which the vehicle travels.

Furthermore, for example, when the light concentrating lens part 200 is located at the second location, the lamp 10 for a vehicle may perform an adaptive driving beam (ADB) function. The ADB function means a function of preventing glares from being caused to a driver of a preceding vehicle by automatically adjusting a lighting angle, a brightness, a width, and a length of the light of the lamp when the preceding vehicle is detected during driving while the high beam pattern is formed, and maintaining brightness of a front road surface and a front traffic sign that are to be identified by the driver.

The DBL and the ADB in the matrix type is a scheme of forming a blind zone in consideration of a space, in which the preceding vehicle is located, or a travel direction of the host vehicle by selectively turning on or off the plurality of light sources 130 in unit of segments.

Figure 12:
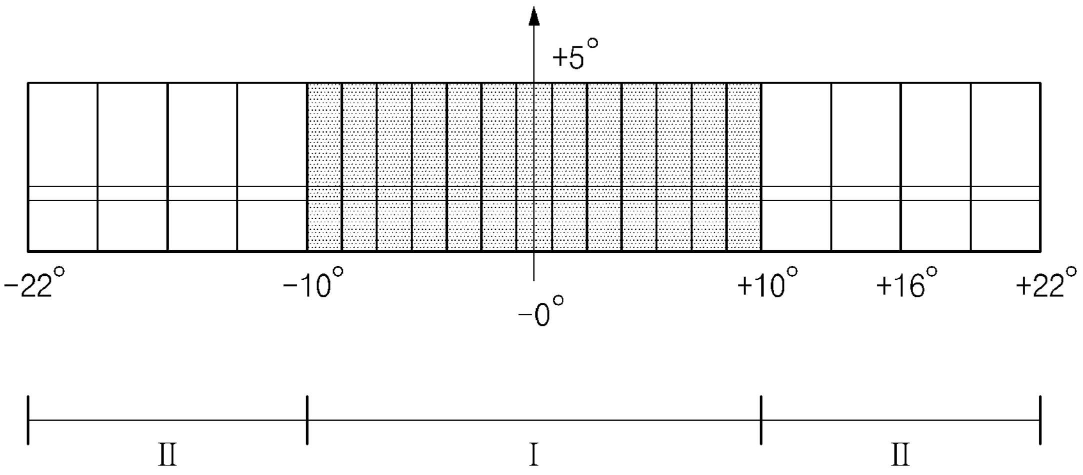
FIG. 12 illustrates an example of a conventional light distribution pattern by a DBL and an ADB of a matrix type using two rows of light sources, and illustrates lighting ranges of the DBL and the ADB.

When the light source 130 for implementing the dynamic bending light (DBL) and the light source 130 for implementing the adaptive driving beam (ADB) are provided separately, the plurality of light sources 130 (for example, LEDs) are necessary, and thus, the price of the lamp increases. In particular, the DBL requires a plurality of LEDs to be implemented, but lighting ratio is low whereby it is disadvantageous in an aspect of price. This is because most of the inclined roads are distributed in a specific range (200R). In other words, this is because the LEDs are disposed with an assumption of a rapid curved surface range (for example, a range of −22 degrees to +22 degrees of FIG. 12, area II) when the LEDs are installed, but some LEDs (for example, a range of −10 degrees to +10 degrees of FIG. 12) are mainly used, except for rapid curved surface ranges of extremely few LEDs.

To solve the problem, the present disclosure provides a technology of implementing a high beam (for example, the ADB) and a low beam (for example, the DBL) with a unit of one light source part 100, by rotating the light concentrating lens part 200.

In this way, according to an embodiment of the present disclosure, costs may be reduced by applying the efficient number of the light sources 130 while implementing the DBL function of the low beam that has been gradually increasingly required.

Furthermore, according to an embodiment of the present disclosure, because a low beam and a high beam may be switched by rotating the light concentrating lens part 200 of alight weight, an inexpensive actuator that is driven by a low torque may be applied as a driving source 520.

Meanwhile, although not illustrated, the present disclosure may further include a shield part, and the shield part may be configured to shield at least a portion of the light that passes through the first optic 210 and be configured to interwork with the light concentrating lens part 200 to be rotated together therewith.

For example, the light that passes through the first optic 210 may be output through the output lens part 400 to form the low beam pattern that is the first light distribution pattern. The shield part may form a cut-off line of the low beam pattern by shielding a portion of the light that passes through the first optic 210.

In detail, to shield the light only when the light concentrating lens part 200 is located at the first location, the shield part may be configured to interwork with the light concentrating lens part 200 to be rotated together therewith. For example, the shield part may be coupled to a rotating component of the light concentrating lens part 200 or the switching driving part 500 to be rotated together therewith. Accordingly, the shield part may be located to shield the light that passes through the first optic 210 when the light concentrating lens part 200 is located at the first location and not to obstruct the light that passes through the second optic 220 when the light concentrating lens part 200 is located at the second location.

Meanwhile, when an area including a center of the board 110 in the leftward/rightward direction is defined as a central area and an area of the board 110, except for the central area, is defined as an outskirt area, the number of the light sources 130 disposed in the central area may be larger than the number of the light sources 130 disposed in the outskirt area.

For example, two rows of light sources 130 may be disposed in the central area of the board 110, and one row of light source 130 may be disposed in the outskirt area of the board 110. Accordingly, an intensity of light of the central area may be higher than an intensity of light of the outskirt area. However, the disposition of the light sources 130 on the board 110 is not limited thereto, and various methods may be applied as long as the intensity of light of the central area may become higher.

In this way, according to the embodiment of the present disclosure, the intensity of light of the central area may be compensated for by the high beam pattern is implemented by using the lamp 10 for a vehicle by increasing the intensity of light of the central area of the board 110 whereby the intensity of light required by the rules may be satisfied.

Meanwhile, the switching driving part 500 include a housing 510, the driving source 520, a shaft member 560, and a gear unit 530.

The housing 510 is a body, on which a configuration included in the switching driving part 500 is mounted, and may be coupled to the lamp housing 510 or the vehicle.

The driving source 520 is mounted on the housing 510. Various kinds may be applied to the driving source 520 with no limitation as long as it may provide the driving power that rotates the light concentrating lens part 200. For example, the driving source 520 may be a DC motor or a solenoid. The illustrated embodiment is an example, to which the DC motor is applied.

The shaft member 560 is mounted on the housing 510, and is configured to be rotated by the driving source 520, and the light concentrating lens part 200 is coupled thereto.

In detail, the light concentrating lens part 200 may be directly or indirectly connected to the shaft member 560. A coupling scheme of the light concentrating lens part 200 and the shaft member 560 is not limited, and the shaft member 560 and the light concentrating lens part 200 may be coupled to each other in various schemes as long as the light concentrating lens part 200 may be rotated together with the shaft member 560 while interworking therewith when the shaft member 560 is rotated.

For example, the lens body 230 may be coupled to output ends of the first optic 210 and the second optic 220. Furthermore, the lens body 230 may be directly coupled to the shaft member 560 or may be indirectly coupled thereto by a connection piece.

The gear unit 530 is connected to the driving source 520 and the shaft member 560 to transmit the driving power generated by the driving source 520 to the shaft member 560.

The gear unit 530 is a member that generates a rotational force by transmitting the driving power to the shaft member 560, and may include one or a plurality of gears. The kind and the number of the gears that constitute the gear unit 530 are not limited, and various kinds of gears may be combined in various schemes.

Furthermore, the switching driving part 500 further includes a connection block 550. The connection block 550 may be fixed to the shaft member 560 to be rotated together therewith, and may be connected to the gear unit 530 to be rotatable.

The connection block 550 may be configured to be rotated about the central axis of the shaft member 560 through the transmission of the driving power by the gear unit 530, and the light concentrating lens part 200 may be configured to interlock with the connection block 550 during the rotation thereof to be rotated.

For example, the connection block 550 may be fixedly coupled to the shaft member 560, and a point that is fixed to the shaft member 560 and a point that is spaced apart therefrom may be connected to the gear unit 530 to be rotatable.

In more detail, the connection block 550 may include a block body 551 and a block boss 552.

The shaft member 560 may pass through the block body 551, and the block body 551 may be fixed to a shaft.

The block boss 552 may protrude from the block body 551, and a pin hole 553, through which a connection pin 535 provided in the gear unit 530 passes may be formed. Shapes of the block body 551 and the block boss 552 are not limited to the illustrated embodiment.

Furthermore, the gear unit 530 and the connection block 550 may be connected to each other through a connection bolt 540. A gear hole may be formed in the gear unit 530, a block hole may be formed in the connection block 550, and the connection bolt 540 may be inserted into and screw-coupled to the gear hole and the block hole (see FIG. 6).

The gear unit 530 may include a first gear 531 that is coupled to a driving shaft 521 of the driving source 520, and a second gear 532 that is enmeshed with the first gear 531 and from which the connection pin 535 protrudes.

For example, the first gear 531 may be concentric to the driving shaft 521, and may be rotated during rotation of the driving shaft 521. A gear that is enmeshed with the gear of the first gear 531 may be formed in the second gear 532, and may be rotated during rotation of the first gear 531.

As an example, a radial distance from a rotation axis of the second gear 532 to a periphery of the second gear 532 may be formed to be different according to a circumferential direction of the second gear 532. That is, the second gear 532 may not have a circular shape, a center of which is the rotation axis of the second gear 532. Gear teeth may be formed in a partial area of an outer peripheral surface of a periphery of the second gear 532, which contacts the first gear 531.

Furthermore, the rotation axis of the second gear 532 and the central axis of the connection pin 535 may be formed at different locations. Accordingly, during rotation of the second gear 532, the connection pin 535 may be rotated about the central axis of the shaft member 560. When the connection pin 535 is rotated, the shaft member 560 fixed to the connection pin 535 may be rotated.

Accordingly, the light concentrating lens part 200 coupled to the shaft member 560 may be rotated about the rotation axis of the shaft member 560 together. Through the rotation, the light concentrating lens part 200 may be selectively located at the first location or the second location.

For example, during driving of the driving source 520 (power on), the shaft member 560 and the light concentrating lens part 200 may be rotated by a designed specific angle in the second direction R2 to be located at the second location. Then, the second optic 220 may be located on a front side of the light source part 100, and the light that passes through the second optic 220 may pass through the output lens part 400 to form the high beam pattern that is the second light distribution pattern.

Meanwhile, when the driving source 520 is not driven (power off), the shaft member 560 and the light concentrating lens part 200 may be rotated in the first direction R1 to be located at the first location. Then, the first optic 210 may be located on a front side of the light source part 100, and the light that passes through the first optic 210 may pass through the output lens part 400 to form the high beam pattern that is the second light distribution pattern.

Hereinafter, a configuration for locating the light concentrating lens part 200 at the first location when the driving source 520 is not driven will be described.

The switching driving part 500 may further include a fixing spring 570. The fixing spring 570 may be provided on an outer surface of the shaft member 560, and may provide an elastic restoring force for restoring the light concentrating lens part 200 to the first location when the driving source 520 is not driven.

The fixing spring 570 may be a coil spring, and may be fitted with an outer peripheral surface of the shaft member 560. Opposite ends of the fixing spring 570 may be configured to protrude. One end 571 of the fixing spring 570 may be fixed to the housing 510, and an opposite end 572 thereof may be fixed to the light concentrating lens part 200. Alternatively, the opposite end 572 of the fixing spring 570 may be connected to the connection pin that connects the light concentrating lens part 200 and the shaft member 560. A spring fixing hook 513 that protrudes such that the one end 571 of the fixing spring 570 is stopped thereby may be formed in the housing 510.

Accordingly, when the light concentrating lens part 200 is rotated in the second direction R2 through the driving of the driving source 520, an elastic repulsive force that rotates the fixing spring 570 in the first direction R1 is formed therein. The elastic repulsive force may be a restoring force that restores the light concentrating lens part 200 to the first location.

Furthermore, the housing 510 may include a stopper boss 511. The stopper boss 511 may protrude at a location, at which the connection block 550 is stopped, such that the rotation of the light concentrating lens part 200 by the fixing spring 570 is restricted. A location and a shape of the stopper boss 511 are not limited, and it may be formed at various locations of the housing 510 as long as it is stopped by the connection block 550 such that rotation thereof in the first direction R1 is restricted.

When the driving of the driving source 520 is completed, the light concentrating lens part 200 is rotated in the first direction R1 by the elastic restoring force of the fixing spring 570, and rotation thereof is restricted by the stopper boss 511 whereby it continues to be located at the first location.

Figure 11:
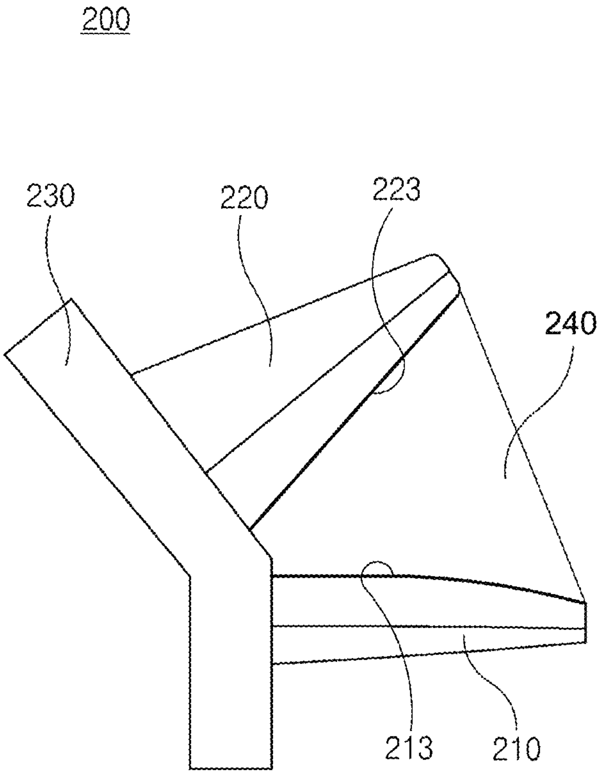
FIG. 11 is a view schematically illustrating a light concentrating lens applied to a lamp for a vehicle according to a second embodiment of the present disclosure.

Meanwhile, hereinafter, the light concentrating lens part 200 according to a second embodiment of the present disclosure will be described with reference to FIG. 11. FIG. 11 is a view schematically illustrating the light concentrating lens part 200 applied to the lamp 10 for a vehicle according to the second embodiment of the present disclosure. The light concentrating lens part 200 according to the second embodiment of the present disclosure is different from the light concentrating lens part 200 according to the above-described first embodiment in that a switching optic 240 is further included between the first optic 210 and the second optic 220. Accordingly, the second embodiment of the present disclosure may include all the above-described features of the first embodiment, except for the difference.

In detail, the light concentrating lens part 200 according to the second embodiment may include the switching optic 240, a first reflective layer 213, and a second reflective layer 223.

The switching optic 240 may be provided between the first optic 210 and the second optic 220, and may be configured to irradiate the light that is input from the light source part 100 to a front side when the light concentrating lens part 200 is rotated.

In detail, the switching optic 240 is a configuration for irradiating the light generated by the light source part 100 to the front side even when the light concentrating lens part 200 is switched from the first location to the second location or from the second location to the first location. Hereinafter, a section, in which the first location is switched to the second location or the second location is switched to the first location, will be referred to as a switching section.

For example, the light concentrating lens part 200 may be manufactured through a dual injection-molding scheme of injection-molding the first optic 210, the second optic 220, and the lens body 230 and then injection-molding the switching optic 240. Furthermore, for example, the switching optic 240 may be formed after the first optic 210, the second optic 220, and the lens body 230 are injection-molded and then the first reflective layer 213 and the second reflective layer 223 are formed.

The first reflective layer 213 may be formed on a surface of the first optic 210, which faces the switching optic 240 and may include a material that reflects the light. The second reflective layer 223 may be formed on a surface of the second optic 220, which faces the switching optic 240 and may include a material that reflects the light.

The first reflective layer 213 and the second reflective layer 223 may reflect the light irradiated from the light source part 100 such that the light faces the front side in the switching section. For example, the first reflective layer 213 and the second reflective layer 223 may be formed by depositing aluminum on the first optic 210 and the second optic 220. However, the material that constitutes the first reflective layer 213 and the second reflective layer 223 is not limited thereto.

According to the second embodiment of the present disclosure, because a brightness of the road surface may be maintained in the switching section by the switching optic 240, the first reflective layer 213, and the second reflective layer 223, a product value and a safety of the lamp 10 for a vehicle may be enhanced.

According to the above-described embodiment of the present disclosure, costs may be reduced by simultaneously implementing the DBL function of the low beam and the ADB function of the high beam by applying an efficient number of light sources.

Furthermore, according to an embodiment of the present disclosure, because the low beam pattern and the high beam pattern may be switched by rotating the light concentrating lens part of a light weight, an inexpensive actuator that is driven by a low torque may be applied as the driving source.

Although the specific embodiments of the present disclosure have been described above, the spirits and range of the present disclosure are not limited thereto, and the present disclosure may be variously corrected and modified by an ordinary person in the art, to which the present disclosure pertains, while not changing the essence of the present disclosure described in the claims.

What is claimed is:

1. A lamp for a vehicle, comprising:

a light source part comprising a board, a plurality of light sources being installed on the board;

a light concentrating lens part configured to concentrate light irradiated from the light source part and configured to be rotatable, said light concentrating part comprising a first optic, a second optic connected to the first optic and a switching optic provided between the first optic and the second optic and configured to irradiate the light input from the light source part to a front side when the light concentrating lens part is rotated;

an output lens part configured to input light concentrated by the first optic or the second optic and to output the light to an outside; and a switching driving part configured to provide a driving force that rotates the light concentrating lens part, wherein the light concentrating lens part is configured to be selectively located, through rotation thereof, at one of a first location, at which the light generated by the light source part is input to the first optic, or a second location, at which the light generated by the light source part is input to the second optic.

2. The lamp of claim 1, wherein when an area comprising a center of the board in a leftward/rightward direction is defined as a central area, and an area of the board except for the central area is defined as an outskirt area, and a number of the light sources disposed in the central area is larger than a number of the light sources disposed in the outskirt area.

3. The lamp of claim 1, wherein the light concentrating lens part further comprises a lens body integrally connecting the first optic and the second optic and configured to transmit the light.

4. The lamp of claim 1, wherein the light concentrating lens part further comprises:

a first reflective layer formed on a surface of the first optic, which faces the switching optic, and comprising a material that reflects the light; and a second reflective layer formed on a surface of the second optic, which faces the switching optic, and comprising a material that reflects the light.

5. The lamp of claim 4, wherein the switching driving part comprises:

a housing;

a driving source mounted on the housing;

a shaft member mounted on the housing and configured to be rotated by the driving source and to which the light concentrating lens part is coupled; and a gear unit connected to the driving source and the shaft member, and configured to transmit driving power generated by the driving source to the shaft member.

6. The lamp of claim 5, wherein the switching driving part further comprises a connection block fixed to the shaft member to be rotated together therewith, and connected to the gear unit to be rotatable, wherein:

the connection block is configured to be rotated about a central axis of the shaft member through transmission of the driving power to the gear unit, and the light concentrating lens part is configured to be rotated to interlock with the connection block when the connection block is rotated.

7. The lamp of claim 6, wherein the connection block, comprises:

a block body through which the shaft member passes; and a block boss protruding from the block body and comprising a pin hole through which a connection pin provided in the gear unit passes.

8. The lamp of claim 7, wherein the gear unit comprises:

a first gear coupled to a driving shaft of the driving source; and a second gear enmeshed with the first gear and from which the connection pin protrudes.

9. The lamp of claim 8, wherein a rotation axis of the second gear and a central axis of the connection pin are formed at different locations.

10. The lamp of claim 6, wherein the switching driving part further comprises a fixing spring provided on an outer surface of the shaft member, and configured to provide an elastic restoring force for restoring the light concentrating lens part to the first location when the driving source is not driven.

11. The lamp of claim 10, wherein the housing comprises a stopper boss protruding at a location at which the connection block is stopped such that rotation of the light concentrating lens part by the fixing spring is restricted.

12. The lamp of claim 1, wherein:

a first light distribution pattern formed by the light that passes the first optic is a low beam pattern, and a second light distribution pattern formed by the light that passes through the second optic is a high beam pattern.

* * * * *